Figure 1:
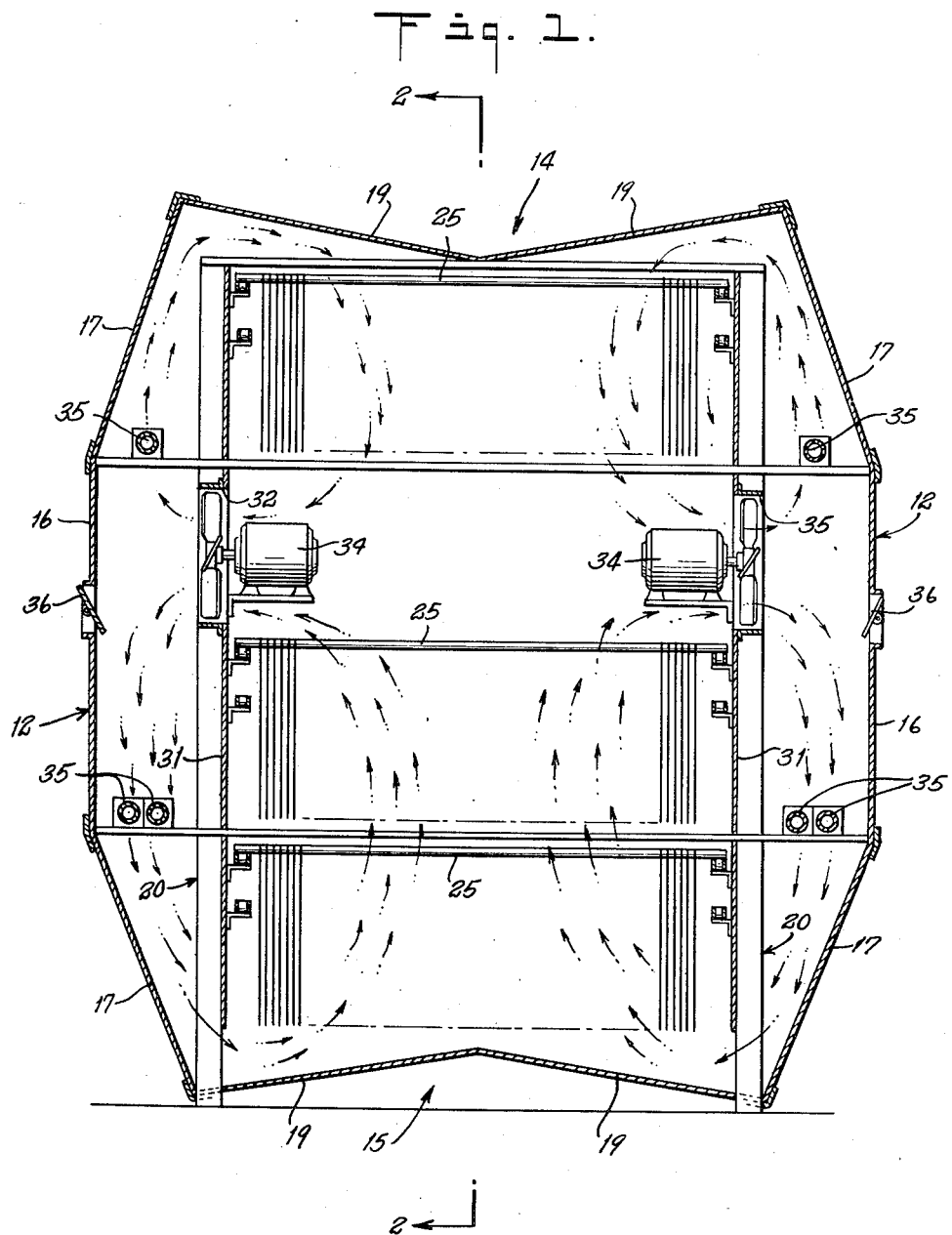

Sept. 3, 1957 J. COFFARO 2,804,697
APPARATUS FOR DRYING LONG ALIMENTARY PASTE PRODUCTS
Filed June 10, 1955 2 Sheets-Sheet 1

INVENTOR.
JOHN COFFARO
BY
Leo C. Krazinski
ATTORNEY

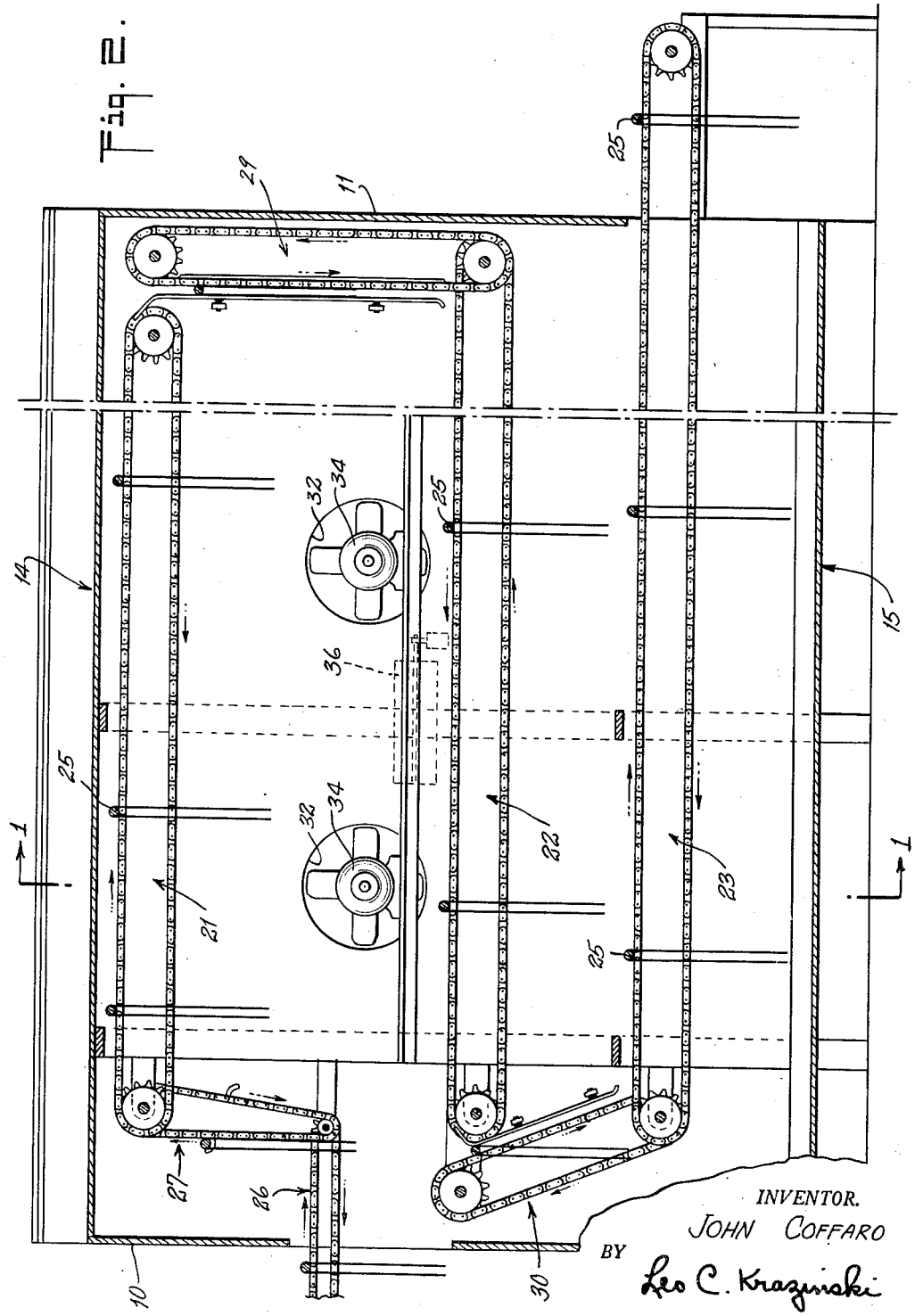

United States Patent Office 2,804,697
Patented Sept. 3, 1957

2,804,697

APPARATUS FOR DRYING LONG ALIMENTARY PASTE PRODUCTS

John Coffaro, Brooklyn, N. Y., assignor to De Francisci Machine Corporation, Brooklyn, N. Y., a corporation of New York Application June 10, 1955, Serial No. 514,453

9 Claims. (Cl. 34—207)

The present invention relates to food processing and, more particularly, to apparatus for drying freshly made long alimentary paste products, such as various sizes and/or shapes of products more generally known as macaroni, noodles and spaghetti.

Products of the foregoing type contain a considerable amount of moisture after being prepared and this moisture must be substantially removed to prevent the product from developing mold during storage in packages. Heretofore it has been customary to place the freshly made product on sticks or hangers and maintain the same in an atmosphere of warm air for a sufficient duration to remove the moisture therefrom. This usually is done by continuously passing the products through a drying chamber equipped with a conveyor system which supports the sticks or hangers. While this appears quite simple, there are several factors in the successful operation of a modern factory for mass production of such products which warrant serious consideration.

It has been found that the products must be dried slowly to remove the moisture uniformly throughout, since rapid drying removes moisture near the surface but not from the core, whereby the products tend to check, crack or warp and are unfit for sale. The generally accepted optimum drying conditions call for maintaining the product in warm air at about 92° F. for about seventy hours, the drying time depending on the cross-sectional area and shape of the product. This means that a factory is limited to a given production output by its size. Since the cost of land, buildings and taxes restrict the size of the factory which can be economically operated with a given amount of capital, the operator's competitive position is precarious unless he has an unlimited amount of capital to expand his facilities in order to survive in the industry.

Accordingly, an object of the present invention is to provide a method of thoroughly and uniformly drying the products, which method is more rapid than existing methods and which method does not induce any tendency of the products to check, crack or warp.

Another object is to provide such a method which can be practiced by moving the products into and out of various drying or curing zones or tiers either manually or by semi-automatic or completely automatic machinery.

Another object is to provide such a method which is simple and practical and can be put to use in an economical manner.

Another object is to provide such a method which approximately doubles the production capacity of a factory of a given size without the requirement of additional space or labor.

A further object is to provide apparatus which is particularly adapted to carry out such a method almost automatically without complicated controls.

A still further object is to provide such apparatus which reduces the drying time to a minimum in the performance of the method whereby production is at a peak and the apparatus soon earns its initial investment cost.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a method of drying freshly made, long alimentary paste products, particularly during its second stage, which comprises subjecting lengths of the product to an atmosphere of warm air, next subjecting the product to an atmosphere of moisture contained air, and then again sujecting the product to warm air.

In carrying out this method the lengths of the product are supported on sticks or hangers and the product laden sticks, after passing through a preliminary drying stage, are placed into or passed through three zones or tiers of the second stage, wherein the desired air conditions are maintained. This second stage dryer reduces the moisture in the product to a point where it can be finish dried more quickly in the finish drying room, so that the time required in the finish drying room is about one-half the time that was previously required.

It has been discovered that air transferred with moisture produces an extremely beneficial and restful effect during particularly the second, intermediate zone. Such tempered air can be derived from the first or last zone or tier upon leaving the same with a portion of its heat spent and having picked up a small amount of moisture removed from the product in drying the same. Preferably, the air from the final drying tier is used for this purpose.

While the present invention should not be bound by any particular theory, it is believed that during the first drying zone of the second stage a considerable portion of the moisture near the surface of the product is removed but without forming a completely dry layer or skin which would trap the moisture remaining in the product nearer the core thereof. In other words, the product remains porous in a sense. In the intermediate zone, the product is subjected to what may be called a non-drying atmosphere, whereby the drying process is at rest or is retarded. This inhibits dry skin formation and enables the moisture in the product nearer the core, which has been heated but not dried in the first zone, to sweat through or boil off to nearer the surface of the product. In the third drying zone this near-surface moisture of the product is carried away by the warm dry air which is also effective to now penetrate to the core and dry the product uniformly throughout, whereby the product is in optical condition for expeditious drying in the finishing room.

It further has been found that in the three processing zones of the second stage each zone can be allocated equal intervals of time, whereby the method is readily adapted for continuous operation, such as is more commonly employed in the industry at present.

As an illustration of a practical example of the method in accordance with the present invention, a spaghetti carrying stick from the preliminary dryer is conveyed to the second drying stage of this invention. Each stick holds about seven pounds of spaghetti, each length of spaghetti being about 22½ inches and the sticks are spaced 1¼ inches apart on the conveyor. The spaghetti is subjected to an atmosphere of moist air and kept at 92° F., plus or minus 1°, throughout the run.

The time required for one stick of spaghetti to pass through the three tiers or zones of the second stage is about six hours, the moisture content of the spaghetti on entering the first or top tier being about 24% and on leaving the third or bottom tier for the finishing room being about 18%.

Actual drying of the spaghetti is accomplished at the top and bottom tiers, the middle tier acting as a rest period therefor, since the air that passes through the middle tier must first pass through the bottom tier, where it picks up moisture from the spaghetti passing therethrough. This moisture laden air has very little, if any, drying qualities and therefore enables the spaghetti in the middle tier to pass therethrough without losing any moisture. The air flow was at about 300 cubic feet per minute. The overall drying time, that is, from the press where the spaghetti is extruded, through the preliminary dryer, thence through the second stage dryer of this invention, and finally through the finish drying room, is about 30 hours which is considerably shorter than the 72 hours heretofore required for the same product by other methods. No defects in the product were observed.

When the conditions of fabricating the freshly made or undried paste products are maintained substantially uniform, the overall drying time is a function of mass and the geometry of the product at constant temperature and air flow. Thus, more slender products require even a shorter drying time than given in the foregoing example.

In the drawings, apparatus is illustrated which is particularly adapted to exploit the present method to its fullest extent, wherein, Fig. 1 is a sectional view of drying apparatus, taken along the line 1—1 on Fig. 2.

Fig. 2 is a sectional view taken along the line 2—2 on Fig. 1.

Referring to the drawings in detail, drying apparatus is shown which essentially comprises an enclosure, a conveyor system, air circulating means, air heating means and a baffle wall arrangement cooperating with the enclosure to define the paths in which the air flows.

The enclosure has an end wall 10 formed with an entrance, an opposite end wall 11 formed with an exit, opposite identical side walls 12, a ceiling 14 and a floor 15. The side walls have a vertical intermediate section 16 and converging upper and lower sections 17. The ceiling and floor are in the form of a shallow V with the ceiling having sections 19 which extend downwardly from both sides thereof and the floor having similar sections 19 which extend upwardly from the sides thereof. The purpose for arranging the sections 16, 17 and 19 in this manner will be made apparent hereinafter.

The conveyor system is supported by a frame 20 within the enclosure and includes three parallel tiers or sections one above the other, namely, an upper section 21, an intermediate section 22 and a lower section 23, which provide the three drying or curing zones referred to herein. The upper section is adjacent the ceiling 14, the lower section is spaced from the floor 15 and the intermediate section is spaced above the lower section but is closer to the lower section than to the upper section in order to provide an air space between the upper and intermediate zones defined by the conveyor sections. These conveyor sections are constructed to move sticks 25, on which lengths of the product are supported, slowly through the processing zones.

The loaded sticks are delivered from the preliminary drying room (not shown) to the enclosure by a conveyor 26, a conveyor 27 transfers the sticks onto the end of the upper conveyor section 21 near the enclosure entrance, a conveyor 29 near the end wall 11 transfers the sticks onto one end of the intermediate conveyor section 22, and a conveyor 30 below the conveyors 26 and 27 transfers the sticks from the other end of the intermediate conveyor section onto one end of the lower conveyor section 23. The other end of the lower conveyor section 23 extends through the enclosure exit to enable the dried products to be removed therefrom and to be transferred to the finish drying room (not shown). The conveyor system is driven by a motor (not shown) at a speed so that the products being processed remain in the enclosure from the entrance to the exit for the interval of time required to process the same.

The portion of the conveyor system within the enclosure is enclosed at the sides thereof by vertical baffle walls 31 supported by the frame 20. The upper and lower ends of the baffle walls are spaced from the ceiling and floor, respectively. The baffle walls are spaced from their adjacent sides 12 and each has one or more openings 32 therein, depending on the length of the enclosure, at about the level of the aforementioned air space between the upper and intermediate zones.

The air circulating means may be fans or blowers 34 supported by the frame 20 and set in the openings 32 to draw air out of the air space and direct the same toward the side wall sections 16.

By reason of the side walls, baffle walls, ceiling and floor arrangement, the air will divide into upper and lower currents at both sides of the enclosure, as indicated by the arrows. The air of the upper currents is deflected inwardly by the upper converging side wall sections 17, passes between the upper ends of the baffle walls and the ceiling, is deflected downwardly by the ceiling sections 19, passes through the upper zone, and re-enters the air space below the upper zone for recirculation by the fans. The air of the lower current is deflected inwardly by the lower converging side wall sections 17, passes between the lower ends of the baffle walls and the floor, is deflected upwardly by the floor sections 19, passes through the lower zone and then the intermediate zone, and re-enters the air space above the intermediate zone for recirculation by the fans.

The air heating means are shown as steam pipes 35 supported by the frame 20 and extending lengthwise in the enclosure between the baffle wall and its adjacent side wall at each side of the enclosure. Preferably, one pipe is so arranged at the level of about the upper edge of the vertical side wall sections 16 (between the upper zone and the air space below it) and one or more such pipes are so arranged at the level of about the lower edge of the wall sections 16 (between the intermediate and lower zones). The upper and lower air currents in passing over these pipes are heated to the desired temperature. The use of two pipes 35 at the last mentioned location enables the lower air current to be heated to a slightly higher temperature than the upper air current.

The temperature of the air may further be controlled by dampers 36 in the side wall sections 16 for admitting room air having a lower temperature.

From the foregoing description it will be seen that the present invention provides an improved method of and apparatus for drying products of the character described herein in a simple, practical, convenient and economical manner. The drier is constructed to withstand constant use for long periods of time without necessity for cleaning or repair.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. Apparatus for drying freshly made long alimentary paste products which comprises an enclosure having an entrance and an exit, a conveyor system for carrying lengths of the product through said enclosure from the entrance to the exit thereof and constructed and arranged to provide three spaced, substantially parallel tiers within said enclosure one above the other which tiers define drying zones for the product between the entrance and exit, and means disposed between a top and intermediate tier of said tiers for circulating warm air so arranged to pass warm air through the zone respectively nearer the entrance and the exit whereby moisture is removed from the product and to pass air containing moisture removed from the product through the zone intermediate the entrance and the exit.

2. Apparatus according to claim 1, wherein said enclosure includes end walls one of which is formed with said entrance and the other of which is formed with said exit, side walls having a vertical intermediate section and having converging upper and lower sections, a shallow V-shaped ceiling, and a shallow inverted V-shaped floor, said side walls, ceiling and floor cooperating to concentrate the air in the aforesaid manner.

3. Apparatus according to claim 2, wherein the uppermost zone extends between said upper converging side wall sections, the lowermost zone extends between said lower converging side wall sections, and the intermediate zone extends between the lower portion of said intermediate vertical side wall sections and is closely adjacent the lowermost zone and is spaced downwardly from the uppermost zone.

4. Apparatus according to claim 3, wherein said air circulating means include fans for directing air against the upper portion of said intermediate side wall section between the uppermost zone and the intermediate zone, and wherein baffle means at the sides of the zones and spaced from said ceiling and floor cause the air to enter the uppermost and lowermost zones at said ceiling and floor, respectively.

5. Apparatus according to claim 4, wherein heat supply means extends horizontally adjacent upper and lower ends of said intermediate vertical side wall sections between said side walls and said baffle means, whereby the air contacts said heat supply means and is heated.

6. Apparatus for drying freshly made long alimentary paste products which comprises an enclosure having end walls one formed with an entrance at the upper portion thereof and the other formed with an exit at the lower portion thereof, side walls, a ceiling and a floor; a conveyor system having three tiers one above the other with the uppermost tier adjacent said ceiling, the lowermost tier adjacent said floor, and the intermediate tier closely adjacent the lowermost tier and spaced downwardly from the uppermost tier to provide an air space therebetween; vertical baffle walls at the sides of said conveyor system spaced from said side walls and terminating short of said floor and ceiling; horizontal heat supply pipes between said side walls and said baffle walls at levels adjacent the lower portion of said uppermost conveyor tier and intermediate said lowermost and intermediate tiers; said baffle walls having openings adjacent said air space, and fans disposed in said air space between said uppermost and intermediate tiers for withdrawing air from said air space and directing the same through said openings to circulate the same across said pipes and inwardly across said ceiling and floor, through said uppermost tier and said lowermost tier, through said intermediate tier after having passed through said lowermost tier, and back into said air space after having passed through said uppermost and intermediate tiers.

7. Apparatus according to claim 6, wherein said side walls converge at the upper and lower ends thereof, said ceiling extends downwardly from both sides thereof, and said floor extends upwardly from both sides thereof.

8. Apparatus of the class described, comprising an enclosure having side walls, a ceiling and a floor, a conveyor system having three tiers one above the other, a baffle wall at the sides of said conveyor system spaced from said side walls and terminating short of said floor and ceiling, and means disposed between a top and an intermediate tier of said tiers for supplying warm air between said side walls and said baffle walls and directing the same toward said ceiling and floor.

9. Apparatus according to claim 8, wherein said side walls converge at the upper and lower ends thereof, said ceiling extends downwardly from both sides thereof, and said floor extends upwardly from both sides thereof.

References Cited in the file of this patent
UNITED STATES PATENTS

| | | |
|---|---|---|
| 2,515,684 | Ambrette | July 18, 1950 |
| 2,631,383 | Bettini | Mar. 17, 1953 |